(12) United States Patent
Yang et al.

(10) Patent No.: US 12,238,806 B2
(45) Date of Patent: Feb. 25, 2025

(54) DRX CONFIGURATION METHOD FOR SIDELINK AND DEVICE

(71) Applicant: VIVO MOBILE COMMUNICATION CO., LTD., Guangdong (CN)

(72) Inventors: Xiaodong Yang, Guangdong (CN); Qian Zheng, Guangdong (CN); Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 292 days.

(21) Appl. No.: 17/676,590

(22) Filed: Feb. 21, 2022

(65) Prior Publication Data

US 2022/0174781 A1 Jun. 2, 2022

Related U.S. Application Data

(63) Continuation of application No. PCT/CN2020/110529, filed on Aug. 21, 2020.

(30) Foreign Application Priority Data

Aug. 22, 2019 (CN) .......................... 201910780098.X (51) Int. Cl.
  *H04W 76/28* (2018.01)
  *H04W 92/18* (2009.01)
(52) U.S. Cl.
  CPC ............ *H04W 76/28* (2018.02); *H04W 92/18* (2013.01)
(58) Field of Classification Search
  CPC .............................. H04W 76/28; H04W 92/18
  USPC ........................................................ 370/328
  See application file for complete search history.

(56) References Cited

U.S. PATENT DOCUMENTS

| 2015/0055532 | A1* | 2/2015 | Lu ......................... H04W 76/28 370/311 |
| 2016/0044740 | A1* | 2/2016 | Siomina ................. H04W 72/02 455/552.1 |
| 2016/0366645 | A1* | 12/2016 | Song .................. H04W 52/0229 |
| 2017/0289940 | A1* | 10/2017 | Yang ..................... H04W 76/27 |
| 2017/0339682 | A1 | 11/2017 | Lee et al. |

(Continued)

FOREIGN PATENT DOCUMENTS

| CN | 104871635 A | 8/2015 |
| CN | 105379406 A | 3/2016 |

(Continued)

OTHER PUBLICATIONS

First Office Action for Chinese Application No. 201910780098.X, dated Nov. 8, 2021, 8 Pages.
International Search Report and Written Opinion for Application No. PCT/CN2020/110529, dated Nov. 25, 2020, 5 Pages.
ZTE, "Discussion on the RRC state of remote UE and relay UE," 3GPP Draft: R2-168199, Nov. 18, 2016, vol. RAN WG2, Reno, USA, Retrieved from the Internet: URL:https://www.3gpp.org/DynaReport/TDocExMtg--R2-96-31671.htm, 5 pages.

(Continued)

*Primary Examiner* — Hermon Asres
(74) *Attorney, Agent, or Firm* — BROOKS KUSHMAN P.C.

(57) ABSTRACT

Embodiments of this application disclose a DRX configuration method for sidelink and a device, where the method includes: determining, by a terminal device, DRX configuration information; and performing DRX configuration according to the configuration information. In the embodiments of this application, a terminal device can determine DRX configuration information, and perform DRX configuration according to the determined configuration information, thereby implementing power saving for terminal devices in sidelink.

18 Claims, 7 Drawing Sheets

(56) References Cited

U.S. PATENT DOCUMENTS

| | | |
|---|---|---|
| 2019/0037534 A1 | 1/2019 | Yasukawa et al. |
| 2019/0174411 A1 | 6/2019 | Xu et al. |
| 2021/0297842 A1 | 9/2021 | Shrivastava |
| 2022/0167268 A1 | 5/2022 | Xu et al. |

FOREIGN PATENT DOCUMENTS

| | | |
|---|---|---|
| CN | 108307489 A | 7/2018 |
| CN | 109155709 A | 1/2019 |
| CN | 109479189 A | 3/2019 |
| EP | 3113548 A1 | 1/2017 |
| EP | 3499975 A1 | 5/2017 |
| EP | 3500028 A1 | 6/2019 |
| JP | 2013201508 A | 10/2013 |
| WO | 2014092612 A1 | 6/2014 |
| WO | 2017135428 A1 | 8/2017 |
| WO | 2018016882 A1 | 1/2018 |
| WO | 2018027821 A1 | 2/2018 |
| WO | 2018028279 A1 | 2/2018 |
| WO | 2018028416 A1 | 2/2018 |
| WO | 2018064477 A1 | 4/2018 |
| WO | WO 2018/064477 * | 4/2018 |

OTHER PUBLICATIONS

First Office Action for Japanese Application No. 2022-512296, dated Feb. 7, 2023, 3 Pages.

Intel Corporation, ITL, "DRX in sidelink", 3GPP TSG RAN WG2, Reno, USA, R2-167764, Nov. 2016, 2 Pages.

Extended European Search Report for European Application No. 20855559.9, dated Sep. 23, 2022, 11 Pages.

Second Office Action for Japanese Application No. 2022-512296, dated Jun. 30, 2023, 4 Pages.

3rd Generation Partnership Project "3rd Generation Partnership Project; Technical Specification Group Radio Access Network; Evolved Universal Terrestrial Radio Access (E-UTRA); Medium Access Control (MAC) protocol specification (Release 15)" 3GPP TS 36.321 V15.6.0, (Jun. 2019), 133 Pages.

First Office Action for Singapore Application No. 11202201631W, dated Feb. 22, 2024, 9 Pages.

First Office Action for Korean Application No. 10-2022-7007278, dated Oct. 28, 2024, 7 Pages.

MediaTek Inc. "UE assistance information for power saving" 3GPP TSG-RAN WG2 Meeting #107, Prague, Czech Republic, Aug. 2019, R2-1910083, 4 Pages.

* cited by examiner

Transmit DRX configuration information to a terminal device, where the configuration information is used for the terminal device to perform DRX configuration ~ S702

DRX CONFIGURATION METHOD FOR SIDELINK AND DEVICE

CROSS-REFERENCE TO RELATED APPLICATIONS

This application is a continuation application of International Application No. PCT/CN2020/110529 filed on Aug. 21, 2020, which claims priority to Chinese Patent Application No. 201910780098.X filed on Aug. 22, 2019, which are incorporated herein by reference in their entirety.

TECHNICAL FIELD

Embodiments of this application relate to the communications field, and in particular, to a discontinuous reception (DRX) configuration method for sidelink and a device.

BACKGROUND

Both long term evolution (LTE) and new radio (NR) systems support sidelink transmission, where data transmission can be performed directly between terminal devices over a radio interface. A DRX mechanism is also introduced to a Uu interface in the LTE system and the NR system, and DRX on and off durations are configured to implement power saving for the terminal devices.

However, the current DRX configuration scheme on the Uu interface is not applied to sidelink. Therefore, how to implement DRX configuration for terminal devices in sidelink is a technical problem to be urgently resolved in the related art.

SUMMARY

Embodiments of this application are intended to provide a DRX configuration method for sidelink and a device, thereby implementing DRX configuration for terminal devices in sidelink.

According to a first aspect, a DRX configuration method for sidelink is provided, including:
  determining, by a terminal device, DRX configuration information; and
  performing DRX configuration according to the configuration information.

According to a second aspect, a DRX configuration method for sidelink is provided, where the method is executed by a network device and includes:
  transmitting DRX configuration information to a terminal device, where the configuration information is used for the terminal device to perform DRX configuration.

According to a third aspect, a terminal device is provided, where the terminal device includes:
  a determining module, configured to determine DRX configuration information; and
  a configuration module, configured to perform DRX configuration according to the configuration information.

According to a fourth aspect, a network device is provided, where the network device includes:
  a transmitting module, configured to transmit DRX configuration information to a terminal device, where the configuration information is used for the terminal device to perform DRX configuration.

According to a fifth aspect, a terminal device is provided, where the terminal device includes a processor, a memory, and a computer program that is stored in the memory and capable of running on the processor. When the computer program is executed by the processor, the steps of the DRX configuration method for sidelink according to the first aspect are implemented.

According to a sixth aspect, a terminal device is provided, where the terminal device includes a processor, a memory, and a computer program that is stored in the memory and capable of running on the processor. When the computer program is executed by the processor, the steps of the DRX configuration method for sidelink according to the second aspect are implemented.

According to a seventh aspect, a computer-readable storage medium is provided, where the computer-readable storage medium stores a computer program. When the computer program is executed by a processor, the steps of the DRX configuration method for sidelink according to the first aspect or the second aspect are implemented.

BRIEF DESCRIPTION OF THE DRAWINGS

The drawings described herein are used to provide a further understanding about this application, and constitute a part of this application. Exemplary embodiments of this application and descriptions thereof are used to explain this application, but do not constitute any inappropriate limitation on this application. In the accompanying drawings.

DETAILED DESCRIPTION

To make the objectives, technical solutions, and advantages of this application clearer, the following clearly and completely describes the technical solutions of this application with reference to specific embodiments of this application and corresponding drawings. Apparently, the described embodiments are merely some rather than all the embodiments of this application. All other embodiments obtained by a person of ordinary skill in the art based on the embodiments of this application without creative efforts fall within the protection scope of this application. The term "and/or" in the embodiments of this specification represents presence of at least one of the connected objects.

It should be understood that the technical solutions of the embodiments of this application may be applied to various communications systems, for example, an LTE sidelink system, an NR sidelink system, or a later evolved sidelink communications system.

In the embodiments of this application, a terminal device may include but is not limited to a mobile station (MS), a mobile terminal, a mobile telephone, user equipment (UE), a handset, portable equipment, a vehicle, and the like. The terminal device may communicate with one or more core networks via a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

In the embodiments of this application, a network device is an apparatus deployed in the radio access network and configured to provide a wireless communication function for terminal devices. The network device may be a base station. The base station may include various forms of macro base stations, micro base stations, relay nodes, access points, and the like. In systems using different radio access technologies, a device having functions of a base station may have different names. For example, the device having functions of a base station is referred to as an evolved NodeB (eNB or eNodeB) in an LTE network, as a NodeB in a third generation (3G) network, or as a network device in the later evolved communications system. Such terminology, however, does not constitute any limitation.

Figure 1:
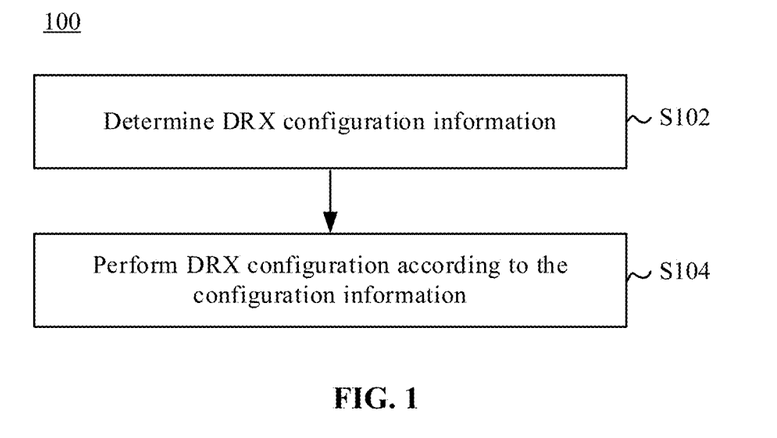
FIG. 1 is a schematic flowchart of a DRX configuration method for sidelink according to an embodiment of this application.

As shown in FIG. 1, an embodiment of this application provides a DRX configuration method 100 for sidelink. The method may be executed by a terminal device and includes the following steps:

S102: Determine DRX Configuration Information.

The terminal device provided in the embodiments of this specification may be a transmitting device transmitting sidelink data or a receiving device receiving sidelink data. Certainly, these two may be one terminal device, because one terminal device can not only execute the step of transmitting sidelink data, but also execute the step of receiving sidelink data.

In this embodiment of this application, a terminal device that performs sidelink communication with the above terminal device is referred to as a peer-end device.

Optionally, in an embodiment, the terminal device may receive configuration information transmitted by the peer-end device in this step. In this embodiment, the peer-end device may perform DRX configuration for the local terminal device.

Optionally, in another embodiment, the terminal device and the peer-end device may pre-agree about configuration information, for example, pre-agreeing about a parameter related to DRX transmission, such as DRX cycle and offset, length of DRX on duration, and length of DRX inactivity duration. In this case, before performing DRX transmission with the peer-end device, the terminal device may determine the configuration information so as to perform DRX configuration according to the pre-agreed configuration information.

Optionally, in another embodiment, a network device may perform DRX configuration for the terminal device and the peer-end device, and the terminal device may receive configuration information transmitted by the network device in this step.

S104: Perform DRX Configuration According to the Configuration Information.

Specifically, for example, in this step, at least one of the following configurations may be performed for the terminal device:

(1) DRX cycle and offset;
(2) length of DRX on duration timer (drx-onDuration Timer);
(3) length of DRX inactivity timer (drx-Inactivity Timer);
(4) length of hybrid automatic repeat request (HARM) round trip time (RTT) timer (drx-HARQ-RTT-Timer); and
(5) length of retransmission timer (drx-Retransmission Timer).

For functions and application methods of the foregoing timers, those for the NR Uu interface may specifically continue to be used, and details are not repeated herein.

According to the DRX configuration method for sidelink provided in this embodiment of this application, a terminal device can determine DRX configuration information, and perform DRX configuration according to the determined configuration information, thereby implementing power saving for terminal devices in a sidelink system.

Figure 2:
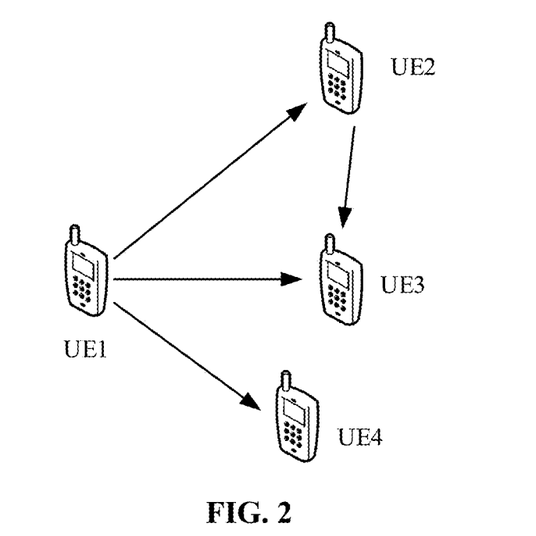
FIG. 2 is a schematic diagram of sidelink transmission according to an embodiment of this application.

In a specific application scenario, as shown in FIG. 2, UE1 can transmit sidelink data to UE2, UE1 can transmit sidelink data to UE3, UE1 can transmit sidelink data to UE4, and UE2 can transmit sidelink data to UE3.

Usually, one UE is unable to receive and transmit sidelink data at the same time. Therefore, when UE2 transmits sidelink data to UE3, UE2 does not expect to receive sidelink data from UE1.

Figure 3:
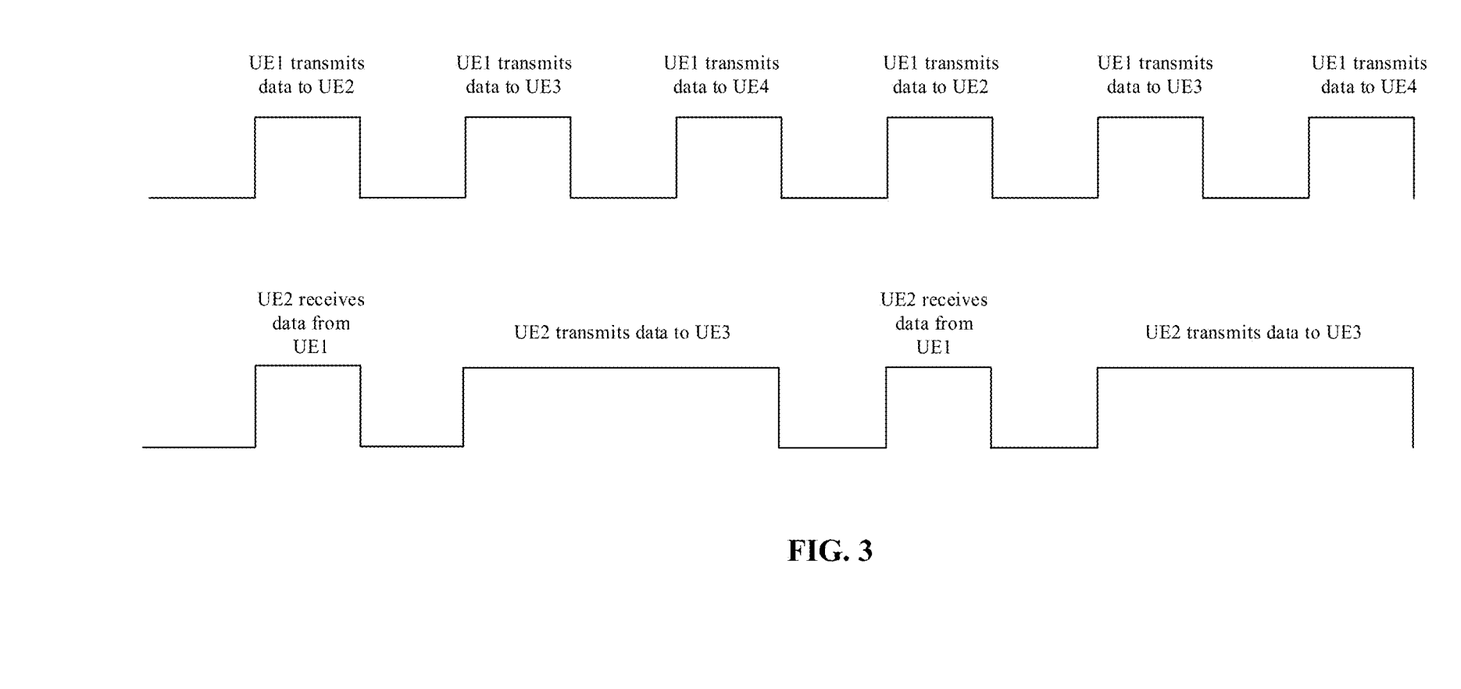
FIG. 3 is a schematic diagram of active periods and dormant periods of UE1 and UE2 according to the embodiment in FIG. 2.

FIG. 3 shows active periods and dormant periods of UE1 and UE2 after DRX configuration is performed for UE1 and UE2 by using the DRX configuration method for sidelink provided in this embodiment of this application. Upward protrusions in a vertical direction in FIG. 3 represent an active/monitoring state, lower portions in the vertical direction represent a dormant state, and a horizontal direction represents a time axis.

In FIG. 3, when UE1 transmits sidelink data to UE2, UE1 and UE2 are both in the active period. Optionally, when UE1 transmits sidelink data to UE2, the active periods of UE1 and UE2 occupy the same time domain position.

In addition, in FIG. 3, when UE1 transmits sidelink data to UE3 and UE4, UE1 is in the active period, and UE2 is also in the active period. As such, UE2 can transmit sidelink data to UE3.

In the embodiment shown in FIG. 3, DRX configuration is performed for the terminal devices, which makes consistent active periods for a pair of terminal devices (for example, UE1 and UE2) performing sidelink data transmission, facilitating sidelink data transmission.

Optionally, in the embodiment shown in FIG. 2, the active periods and the dormant periods of UE1 and UE2 may occupy exactly the same time domain positions. To be specific, the active periods of UE1 and UE2 occupy the same time domain positions, and the dormant periods of UE1 and UE2 also occupy the same time domain positions.

As described in the method 100, the peer-end device may perform DRX configuration for a local terminal device. Optionally, before the method 100 is executed, the following step may be further included: the terminal device transmits DRX assistance information or a DRX configuration request to the peer-end device. Alternatively, the terminal device transmits DRX assistance information or a DRX configuration request to the network device.

In this case, S102 in the foregoing embodiment may be specifically that the terminal device receives the DRX configuration information. The configuration information may be from the peer-end device or from the network device.

Specifically, for example, in the embodiments shown in FIG. 2 and FIG. 3, UE2 transmits DRX assistance information or a DRX configuration request to UE1.

In an embodiment, the terminal device may transmit DRX assistance information, and the DRX assistance information may be used for the peer-end device to perform DRX configuration for the terminal device according to the DRX assistance information. Certainly, the peer-end device may ignore the assistance information and directly perform DRX configuration for the terminal device.

In this embodiment, the terminal device can transmit DRX assistance information. In this way, when performing DRX configuration for the terminal device, the peer-end device can fully consider a sidelink transmission status of the terminal device in combination with a sidelink transmission status of the peer-end device itself. To some extent, it is equivalent that the terminal device and the peer-end device negotiate an optimal DRX configuration, to maximize a power saving effect for the terminal device and the peer device.

In another embodiment, the terminal device may transmit a DRX configuration request, where the DRX configuration request is used to request the peer-end device to perform DRX configuration for the terminal device. In this embodiment, the peer-end device can directly perform DRX configuration for the terminal device.

Certainly, in yet another embodiment, the terminal device may transmit both DRX assistance information and a DRX configuration request. For purposes of the DRX assistance information and the DRX configuration request, refer to the foregoing description.

The terminal device described in the foregoing embodiments is a receiving device of sidelink data, and the peer-end device is a transmitting device of sidelink data; or the terminal device described in the foregoing embodiments is a transmitting device of sidelink data, and the peer-end device is a receiving device of sidelink data. Certainly, the terminal device described in the foregoing embodiments may not only transmit sidelink data to the peer-end device, but also receive sidelink data transmitted by the peer-end device. Correspondingly, the peer-end device may not only receive sidelink data transmitted by the terminal device, but also transmit sidelink data to the terminal device.

It should be noted that the terminal device and the peer-end device described in the embodiments of this specification are described from the perspective of the local terminal device. It can be understood that the peer-end device may be referred to as a local terminal device and the terminal device described above may be referred to as a peer-end device.

In the foregoing embodiments, after performing DRX configuration according to the configuration information, the terminal device may further transmit DRX feedback information to the peer-end device, where the DRX feedback information may be used to indicate a DRX configuration status. For example, the DRX feedback information indicates that the DRX configuration succeeds or indicates that the DRX configuration fails.

Optionally, the DRX assistance information described in the foregoing embodiments includes at least one of the following:

DRX cycle and offset expected by the terminal device;
length of DRX on duration timer expected by the terminal device;
length of DRX inactivity timer expected by the terminal device;
length of HARQ RTT timer expected by the terminal device;
length of retransmission timer expected by the terminal device;
time-domain unit(s) in which the terminal device does not expect DRX to be activated, where the time-domain unit mentioned herein may be a subframe, a slot, or the like; and
time-domain unit(s) in which the terminal device expects DRX to be activated.

As described in the foregoing method 100, the network device may perform DRX configuration for the terminal device and the peer-end device. Optionally, S102 in this embodiment may be specifically that the terminal device receives DRX configuration information transmitted by the network device, where the configuration information is determined by the network device. Certainly, the peer-end device may also receive the configuration information transmitted by the network device and perform DRX configuration. In this embodiment, the terminal device and the peer-end device both maintain an RRC connection to the network device.

Optionally, in the foregoing embodiment, the terminal device may further receive indication information, where the indication information is used to indicate a peer-end device targeted by the configuration information. For example, the indication information indicates identification information of the peer-end device.

Optionally, after performing DRX configuration according to the configuration information, the terminal device may further transmit DRX feedback information to the network device, where the DRX feedback information may be used to indicate a DRX configuration status. For example, the DRX feedback information indicates that the DRX configuration succeeds or indicates that the DRX configuration fails.

In actual application, the network device may configure a transmit DRX mode for the terminal device, and inform the terminal device of a peer-end device targeted by the transmit DRX mode; and the network device configures a receive DRX mode for the peer-end device, and informs the peer-end device of a terminal device targeted by the receive DRX mode. The foregoing description assumes that the terminal device is a transmitting device and that the peer-end device is a receiving device. Actually, in a case that the terminal device is a receiving device and the peer-end device is a transmitting device, the network device may also configure corresponding receive and transmit DRX modes for the terminal device and the peer-end device.

This embodiment is particularly applicable to scenarios where a resource allocation mode for the terminal device is a network device scheduling mode (Mode 1). Because the network device allocates resources for a pair of terminal devices performing sidelink data transmission, it is easier for the network device to determine time domain positions for sidelink data transmission between the pair of terminal devices. In this way, when performing DRX configuration for the terminal devices, the network device can configure as many time periods as possible in which sidelink data transmission is not performed as dormant periods, thereby maximizing a power saving effect for the terminal devices.

In order to describe in detail the DRX configuration method for sidelink provided in the embodiments of this application, the following provides description with reference to several specific embodiments.

Embodiment 1

Figure 4:
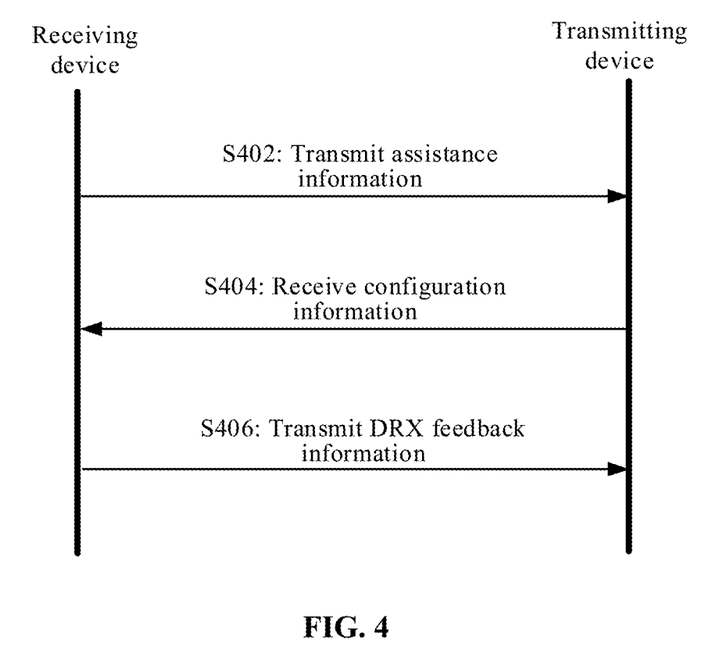
FIGS. 4 to 6 are schematic flowcharts of a DRX configuration method for sidelink according to three specific embodiments of this application.

As shown in FIG. 4, this embodiment may be executed by a sidelink receiving device (hereinafter referred to as receiving device), and includes the following steps:

S402: Transmit Assistance Information.

In this embodiment, the receiving device may specifically transmit assistance information to a sidelink transmitting device (hereinafter referred to as transmitting device), and the transmitting device performs DRX configuration for the receiving device. The transmitting device may perform DRX configuration for the receiving device with the assistance information considered, or perform DRX configuration for the receiving device with the assistance information ignored.

The assistance information includes at least one of the following:

DRX cycle and offset expected by the receiving device;
length of DRX on duration timer expected by the receiving device;
length of DRX inactivity timer expected by the receiving device;
length of HARQ RTT timer expected by the receiving device;
length of retransmission timer expected by the receiving device;
time-domain unit(s) in which the receiving device does not expect DRX to be activated, where the time-domain unit mentioned herein may be a subframe, a slot, or the like; and
time-domain unit(s) in which the receiving device expects DRX to be activated.

S404: Receive DRX Configuration Information.

After receiving the configuration information, the receiving device may perform DRX configuration according to the configuration information. For a specific configuration process, refer to the description in the foregoing embodiments.

S406: Transmit DRX Feedback Information.

The DRX feedback information may be used to indicate a DRX configuration status. For example, the DRX feedback information indicates that the DRX configuration succeeds or indicates that the DRX configuration fails.

Optionally, in other embodiments, step S402 and step S406 may be omitted, that is, the transmitting device directly performs DRX configuration for the receiving device.

Embodiment 2

Figure 5:
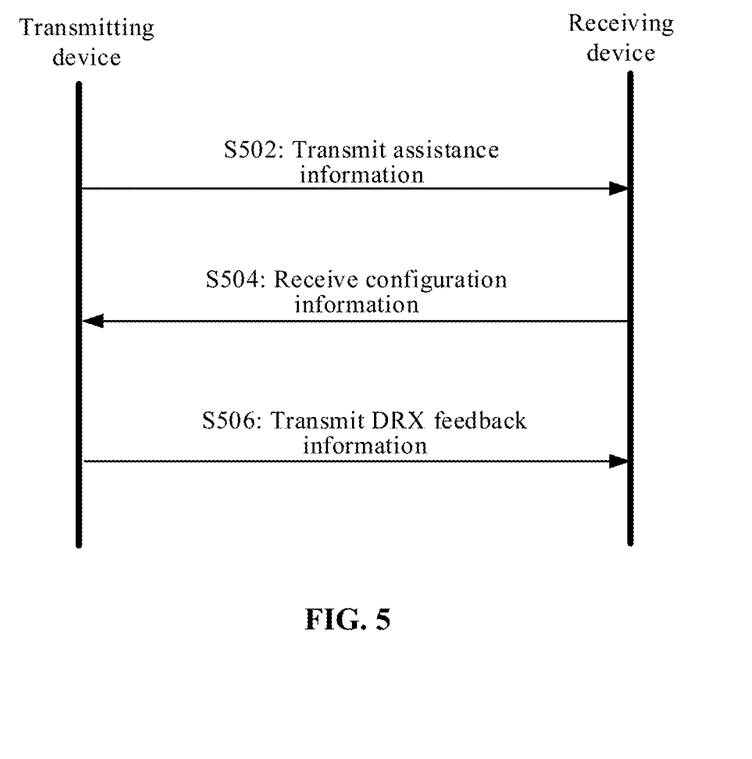

As shown in FIG. 5, this embodiment may be executed by a sidelink transmitting device (hereinafter referred to as transmitting device), including the following steps:

S502: Transmit Assistance Information.

In this embodiment, the transmitting device may specifically transmit assistance information to a sidelink receiving device (hereinafter referred to as receiving device), and the receiving device performs DRX configuration for the transmitting device. The receiving device may perform DRX configuration for the transmitting device with the assistance information considered, or perform DRX configuration for the transmitting device with the assistance information ignored.

The assistance information includes at least one of the following:

DRX cycle and offset expected by the transmitting device;
length of DRX on duration timer expected by the transmitting device;
length of DRX inactivity timer expected by the transmitting device;
length of HARQ RTT timer expected by the transmitting device;
length of retransmission timer expected by the transmitting device;
time-domain unit(s) in which the transmitting device does not expect DRX to be activated, where the time-domain unit mentioned herein may be a subframe, a slot, or the like; and
time-domain unit(s) in which the transmitting device expects DRX to be activated.

S504: Receive DRX Configuration Information.

After receiving the configuration information, the transmitting device may perform DRX configuration according to the configuration information. For a specific configuration process, refer to the description in the foregoing embodiments.

S506: Transmit DRX Feedback Information.

The DRX feedback information may be used to indicate a DRX configuration status. For example, the DRX feedback information indicates that the DRX configuration succeeds or indicates that the DRX configuration fails.

Optionally, in other embodiments, step S502 and step S506 may be omitted, that is, the receiving device directly performs DRX configuration for the transmitting device.

Embodiment 3

Figure 6:
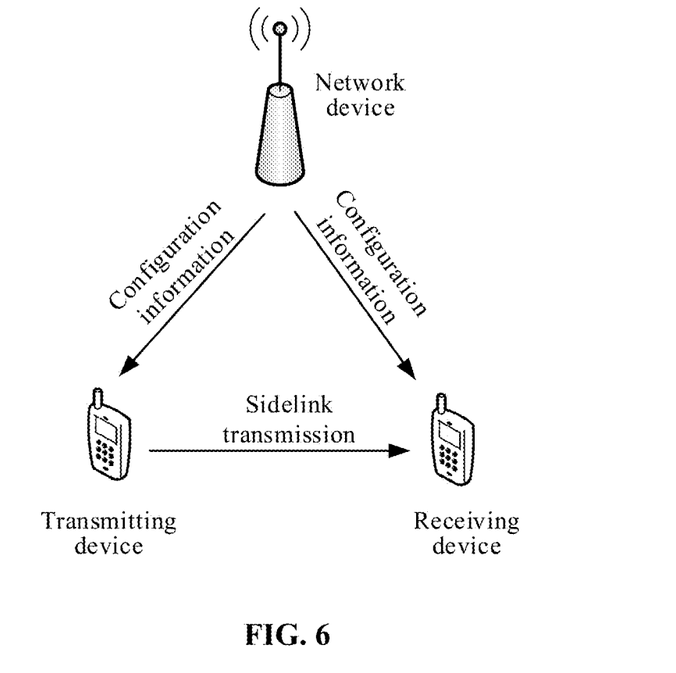

As shown in FIG. 6, a network device in this embodiment may perform DRX configuration for a sidelink transmitting device (hereinafter referred to as transmitting device) and a sidelink receiving device (hereinafter referred to as receiving device), and the transmitting device and the receiving device may receive configuration information transmitted by the network device. In this embodiment, the transmitting device and the receiving device both maintain an RRC connection to the network device.

Optionally, in this embodiment, the transmitting device may further receive indication information, where the indication information is used to indicate the receiving device, for example, indicating identification information of the receiving device.

Optionally, in this embodiment, the receiving device may further receive indication information, where the indication information is used to indicate the transmitting device, for example, indicating identification information of the transmitting device.

The foregoing describes in detail the DRX configuration method for sidelink according to this embodiment of this application with reference to FIGS. 1 to 6. The following describes in detail a DRX configuration method for sidelink according to another embodiment of this application with reference to FIG. 7. It can be understood that interaction between a network device and a terminal device described from the perspective of the network device is the same as the description from the perspective of the terminal device in the method shown in FIG. 1, and therefore related description is appropriately omitted to avoid repetition.

Figure 7:
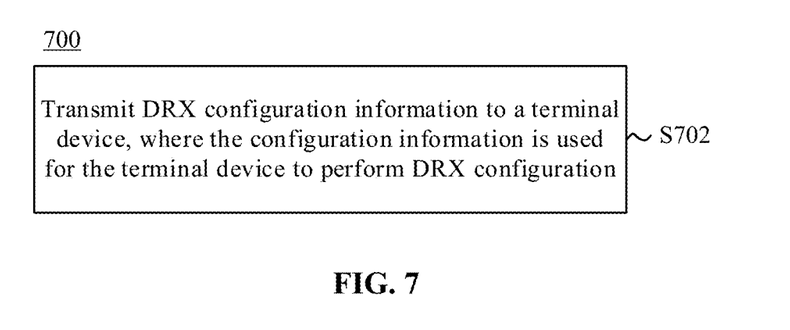
FIG. 7 is a schematic flowchart of a DRX configuration method for sidelink according to another embodiment of this application.

FIG. 7 is a schematic diagram of an implementation process of a DRX configuration method for sidelink according to an embodiment of this application, which may be applied to the network device side. As shown in FIG. 7, the method 700 includes:

S702: Transmit DRX Configuration Information to a Terminal Device, where the Configuration Information is Used for the Terminal Device to Perform DRX Configuration.

In this embodiment of this application, a terminal device can receive DRX configuration information, and perform DRX configuration according to the configuration information, thereby implementing power saving for terminal devices in a sidelink system.

Optionally, in an embodiment, after the transmitting DRX configuration information, the method further includes:
transmitting the configuration information to a peer-end device targeted by the configuration information, where the configuration information is also used for the peer-end device to perform DRX configuration.

Optionally, in an embodiment, after the transmitting the configuration information to a peer-end device targeted by the configuration information, the method further includes:
transmitting first indication information to the terminal device, where the first indication information is used to indicate the peer-end device; and/or transmitting second indication information to the peer-end device, where the second indication information is used to indicate the terminal device.

The foregoing describes in detail the DRX configuration method for sidelink according to this embodiment of this application with reference to FIGS. 1 to 7. The following describes in detail a terminal device according to an embodiment of this application with reference to FIG. 8.

Figure 8:
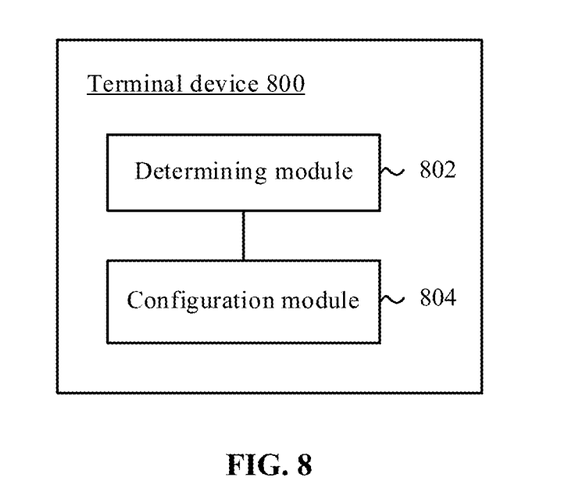
FIG. 8 is a schematic structural diagram of a terminal device according to an embodiment of this application.

FIG. 8 is a schematic structural diagram of a terminal device according to an embodiment of this application. As shown in FIG. 8, the terminal device 800 includes:
a determining module 802, where the determining module 802 may be configured to determine DRX configuration information; and a configuration module 804, where the configuration module 804 may be configured to perform DRX configuration according to the configuration information.

The terminal device provided in this embodiment of this application can determine DRX configuration information, and perform DRX configuration according to the determined configuration information, thereby implementing power saving for terminal devices in a sidelink system.

Optionally, in an embodiment, the determining module 802 may be configured to receive DRX configuration information transmitted by a peer-end device, where the configuration information is determined by the peer-end device.

Optionally, in an embodiment, the terminal device is a sidelink receiving device, and the peer-end device is a sidelink transmitting device; or the terminal device is a sidelink transmitting device, and the peer-end device is a sidelink receiving device.

Optionally, in an embodiment, the determining module 802 may be configured to transmit DRX feedback information to the peer-end device, where the DRX feedback information indicates that the DRX configuration succeeds or indicates that the DRX configuration fails.

Optionally, in an embodiment, the determining module 802 may be configured to transmit DRX assistance information or a DRX configuration request to the peer-end device; or transmit DRX assistance information or a DRX configuration request to a network device.

Optionally, in an embodiment, the DRX assistance information includes at least one of the following:

DRX cycle and offset;
length of DRX on duration timer;
length of DRX inactivity timer;
length of hybrid automatic repeat request HARQ round trip time RTT timer;
length of retransmission timer;
time-domain unit(s) in which the terminal device does not expect DRX to be activated; and
time-domain unit(s) in which the terminal device expects DRX to be activated.

Optionally, in an embodiment, the configuration information is pre-agreed by the terminal device and the peer-end device.

Optionally, in an embodiment, the determining module 802 may be configured to receive configuration information transmitted by the network device, where the configuration information is determined by the network device.

Optionally, in an embodiment, the determining module 802 may be configured to receive indication information, wherein
the indication information is used to indicate the peer-end device targeted by the configuration information; and the network device is further configured to perform DRX configuration for the peer-end device.

Optionally, in an embodiment, the determining module 802 may be configured to transmit DRX feedback information to the network device, where the DRX feedback information indicates that the DRX configuration succeeds or indicates that the DRX configuration fails.

For the terminal device 800 according to this embodiment of this application, reference may be made to the processes of the method 100 in the corresponding embodiment of this application, and the units/modules of the terminal device 800 and other operations and/or functions described above are respectively intended to implement the corresponding processes in the method 100, with the same or equivalent technical effects achieved. For brevity, details are not repeated herein.

Figure 9:
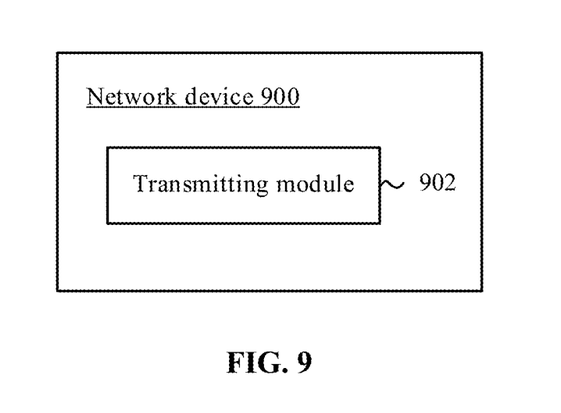
FIG. 9 is a schematic structural diagram of a network device according to an embodiment of this application.

FIG. 9 is a schematic structural diagram of a network device according to an embodiment of this application. As shown in FIG. 9, the network device 900 includes:
a transmitting module 902, where the transmitting module 902 may be configured to transmit DRX configuration information to a terminal device, and the configuration information is used for the terminal device to perform DRX configuration.

In this embodiment of this application, a terminal device can receive DRX configuration information, and perform DRX configuration according to the configuration information, thereby implementing power saving for terminal devices in a sidelink system.

Optionally, in an embodiment, the transmitting module 902 is further configured to: transmit the configuration information to a peer-end device targeted by the configuration information, where the configuration information is used for the peer-end device to perform DRX configuration.

Optionally, in an embodiment, the transmitting module 902 is further configured to: transmit first indication information to the terminal device, where the first indication information is used to indicate the peer-end device; and/or transmit second indication information to the peer-end device, where the second indication information is used to indicate the terminal device.

For the network device 900 according to this embodiment of this application, reference may be made to the processes of the method 700 in the corresponding embodiment of this application, and the units/modules of the network device 900 and other operations and/or functions described above are respectively intended to implement the corresponding processes in the method 700, with the same or equivalent technical effects achieved. For brevity, details are not repeated herein.

Figure 10:
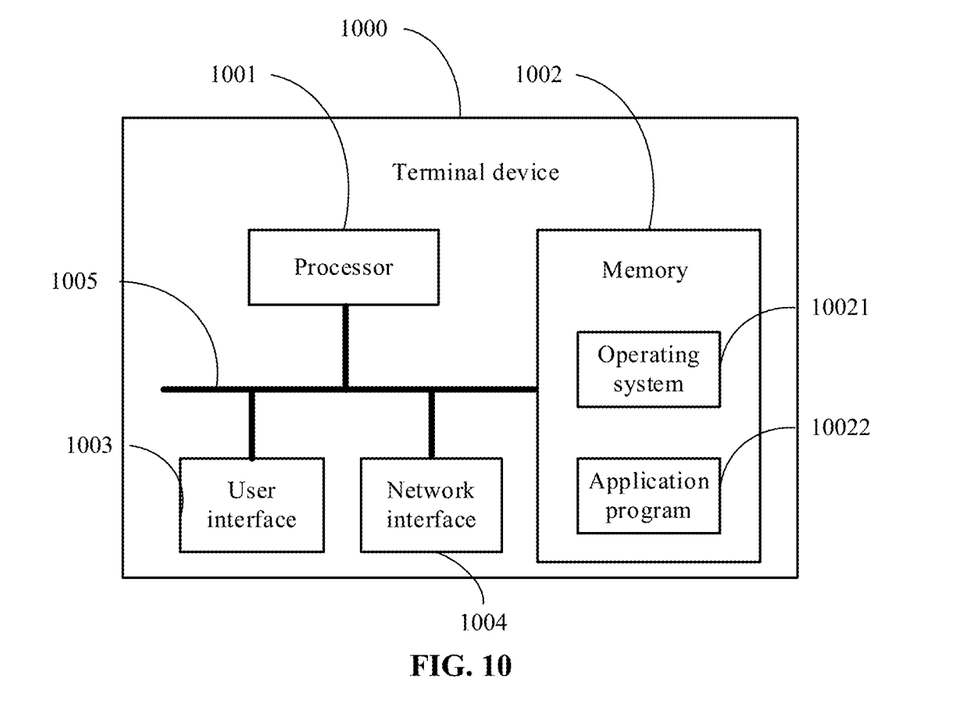
FIG. 10 is a schematic structural diagram of a terminal device according to another embodiment of this application.

FIG. 10 is a block diagram of a terminal device according to another embodiment of this application. The terminal device 1000 shown in FIG. 10 includes at least one processor 1001, a memory 1002, at least one network interface 1004, and a user interface 1003. The components in the terminal device 1000 are coupled together through a bus system 1005. It can be understood that the bus system 1005 is configured to implement connection and communication between these components. In addition to a data bus, the bus system 1005 further includes a power bus, a control bus, and a status signal bus. However, for clarity of description, various buses are marked as the bus system 1005 in FIG. 10.

The user interface 1003 may include a display, a keyboard, a pointing device (for example, a mouse or a trackball), a touch panel or a touchscreen, and the like.

It can be understood that the memory 1002 in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1002 in the system and method described in this embodiment of this application is intended to include but is not limited to these and any other suitable types of memories.

In some implementations, the memory 1002 stores the following elements: executable modules or data structures, or a subset thereof, or an extended set thereof: an operating system 10021 and an application program 10022.

The operating system 10021 includes various system programs, such as a framework layer, a core library layer, and a driver layer, and is used to implement various basic services and process hardware-based tasks. The application program 10022 includes various application programs, such as a media player and a browser, and is used to implement various application services. A program for implementing the method in this embodiment of this application may be included in the application program 10022.

In this embodiment of this application, the terminal device 1000 further includes a computer program stored in the memory 1002 and capable of running on the processor 1001. When the computer program is executed by the processor 1001, the steps of the method 100 are implemented.

The method disclosed in the foregoing embodiments of this application may be applied to the processor 1001 or implemented by the processor 1001. The processor 1001 may be an integrated circuit chip that has a signal processing capability. During implementation, the steps of the foregoing method may be completed by hardware integrated logic circuits in the processor 1001 or instructions in the form of software. The processor 1001 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor 1001 may implement or execute the methods, steps, and logical block diagrams disclosed in the embodiments of this application. The general-purpose processor may be a microprocessor, or the processor may be any conventional processor or the like. The steps of the methods disclosed with reference to the embodiments of this application may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory or electrically erasable programmable memory, or a register. The computer-readable storage medium is located in the memory 1002, and the processor 1001 fetches information in the memory 1002, and completes the steps of the foregoing method accordingly in combination with its hardware. Specifically, the computer-readable storage medium stores a computer program, and when the computer program is executed by the processor 1001, the steps of the embodiments of the foregoing method 100 are implemented.

It can be understood that the embodiments described in the embodiments of this application may be implemented by hardware, software, firmware, middleware, microcode, or a combination thereof. For hardware implementation, the processing unit may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, other electronic units for performing the functions described in this application, or combinations thereof.

For software implementation, the technologies described in the embodiments of this application may be implemented by modules (for example, processes or functions) that perform the functions described in the embodiments of this application. Software code may be stored in the memory and executed by the processor. The memory may be implemented in or outside the processor.

The terminal device 1000 can implement the processes implemented by the terminal device in the foregoing embodiments, with the same or equivalent technical effects achieved. To avoid repetition, details are not described herein again.

Figure 11:
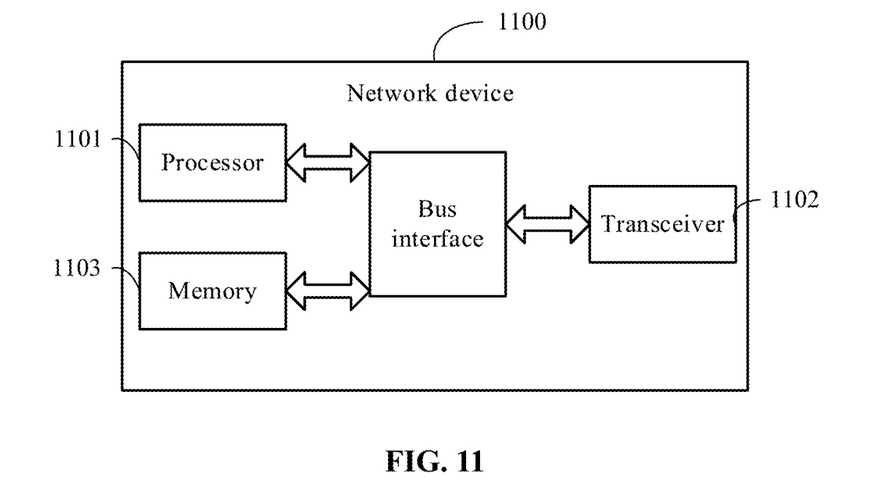
FIG. 11 is a schematic structural diagram of a network device according to another embodiment of this application.

Referring to FIG. 11, FIG. 11 is a structural diagram of a network device to which the embodiments of this application are applied. The network device can implement details of the method embodiment 700, with the same effect achieved. As shown in FIG. 11, the network device 1100 includes a processor 1101, a transceiver 1102, a memory 1103, and a bus interface.

In this embodiment of this application, the network device 1100 further includes a computer program stored in the memory 1103 and capable of running on the processor 1101. When the computer program is executed by the processor 1101, the steps of the method 700 are implemented.

In FIG. 11, a bus architecture may include any quantity of interconnected buses and bridges, specifically for interconnecting various circuits of one or more processors represented by the processor 1101 and a memory represented by the memory 1103. The bus architecture may further interconnect various other circuits such as a peripheral device, a voltage regulator, and a power management circuit. These are all well known in the art, and therefore are not further described in this specification. The bus interface provides interfaces. The transceiver 1102 may be a plurality of components, that is, the transceiver 1102 includes a transmitter and a receiver, and provides a unit for communicating with various other apparatuses on a transmission medium.

The processor 1101 is responsible for management of the bus architecture and general processing, and the memory 1103 may store data for use by the processor 1101 when the processor 1101 performs an operation.

Embodiments of this application further provide a computer-readable storage medium, where the computer-readable storage medium stores a computer program. When the computer program is executed by a processor, the processes of the foregoing method embodiments 100 and 700 are implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that in this specification, the term "comprise", "include", or any other variant thereof is intended to cover a non-exclusive inclusion, such that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In many cases, the former is a more preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are only illustrative rather than restrictive. Inspired by this application, persons of ordinary skill in the art can still derive many variations without departing from the essence of this application and the protection scope of the claims. All these variations shall fall within the protection scope of this application.

What is claimed is:

1. A discontinuous reception DRX configuration method for sidelink, comprising:
   determining, by a terminal device, DRX configuration information; and
   performing DRX configuration according to the configuration information,
   wherein the determining, by a terminal device, DRX configuration information comprises at least one of the following:
   determining, by the terminal device, the configuration information through pre-agreeing with a peer-end device; and
   receiving, by the terminal device, the DRX configuration information transmitted by a peer-end device, wherein the configuration information is determined by the peer-end device;
   wherein before the determining, by the terminal device, DRX configuration information, the method further comprises:
   transmitting, by the terminal device, DRX assistance information to the peer-end device;
   wherein the DRX assistance information comprises at least one of the following:
   DRX cycle and offset;
   length of DRX on duration timer;
   length of DRX inactivity timer;
   length of hybrid automatic repeat request HARQ round trip time RTT timer;
   length of retransmission timer;
   time-domain unit(s) in which the terminal device does not expect DRX to be activated; and
   time-domain unit(s) in which the terminal device expects DRX to be activated,
   wherein the terminal device is a sidelink receiving device, and the peer-end device is a sidelink transmitting device; or
   the terminal device is a sidelink transmitting device, and the peer-end device is a sidelink receiving device.

2. The method according to claim 1, wherein after the performing DRX configuration according to the configuration information, the method further comprises:
   transmitting DRX feedback information to the peer-end device, wherein
   the DRX feedback information indicates that the DRX configuration succeeds or indicates that the DRX configuration fails.

3. The method according to claim 1, wherein before the determining, by a terminal device, DRX configuration information, the method further comprises:
   transmitting, by the terminal device, DRX assistance information or a DRX configuration request to a network device.

4. The method according to claim 1, wherein the determining, by a terminal device, DRX configuration information further comprises:
   receiving, by the terminal device, DRX configuration information transmitted by a network device, wherein the configuration information is determined by the network device.

5. The method according to claim 4, wherein the method further comprises:
   receiving indication information, wherein
   the indication information is used to indicate a peer-end device targeted by the configuration information; and
   the network device is further configured to perform DRX configuration for the peer-end device.

6. The method according to claim 4, wherein after the performing DRX configuration according to the configuration information, the method further comprises:
   transmitting DRX feedback information to the network device, wherein the DRX feedback information indicates that the DRX configuration succeeds or indicates that the DRX configuration fails.

7. A terminal device, comprising: a memory, a processor, and a computer program stored in the memory and capable of running on the processor, wherein when the computer program is executed by the processor, the following steps are implemented:
determining DRX configuration information; and
performing DRX configuration according to the configuration information,
wherein the determining DRX configuration information comprises at least one of the following:
determining the configuration information through pre-agreeing with a peer-end device; and
receiving the DRX configuration information transmitted by a peer-end device, wherein the configuration information is determined by the peer-end device;
wherein before the determining DRX configuration information, the processor is configured to: transmit DRX assistance information to the peer-end device;
wherein the DRX assistance information comprises at least one of the following:
DRX cycle and offset;
length of DRX on duration timer;
length of DRX inactivity timer;
length of hybrid automatic repeat request HARQ round trip time RTT timer;
length of retransmission timer;
time-domain unit(s) in which the terminal device does not expect DRX to be activated; and
time-domain unit(s) in which the terminal device expects DRX to be activated,
wherein the terminal device is a sidelink receiving device, and the peer-end device is a sidelink transmitting device; or
the terminal device is a sidelink transmitting device, and the peer-end device is a sidelink receiving device.

8. The terminal device according to claim 7, wherein before the determining DRX configuration information,
the processor is further configured to:
transmit DRX assistance information or a DRX configuration request to a network device.

9. A non-transitory computer-readable storage medium, wherein the computer-readable storage medium stores a computer program, and the computer program is executed by a processor to perform the following steps:
determining DRX configuration information; and
performing DRX configuration according to the configuration information,
wherein the determining DRX configuration information comprises at least one of the following:
determining the configuration information through pre-agreeing with a peer-end device; and
receiving the DRX configuration information transmitted by a peer-end device, wherein the configuration information is determined by the peer-end device;
wherein before the determining DRX configuration information, the computer program is executed by the processor to: transmit DRX assistance information to the peer-end device;
wherein the DRX assistance information comprises at least one of the following:
DRX cycle and offset;
length of DRX on duration timer;
length of DRX inactivity timer;
length of hybrid automatic repeat request HARQ round trip time RTT timer;
length of retransmission timer;
time-domain unit(s) in which the terminal device does not expect DRX to be activated; and
time-domain unit(s) in which the terminal device expects DRX to be activated,
wherein the terminal device is a sidelink receiving device, and the peer-end device is a sidelink transmitting device; or
the terminal device is a sidelink transmitting device, and the peer-end device is a sidelink receiving device.

10. The terminal device according to claim 7, wherein after the performing DRX configuration according to the configuration information, the processor is further configured to:
transmit DRX feedback information to the peer-end device, wherein the DRX feedback information indicates that the DRX configuration succeeds or indicates that the DRX configuration fails.

11. The terminal device according to claim 7, wherein the determining DRX configuration information further comprises:
receiving DRX configuration information transmitted by a network device, wherein the configuration information is determined by the network device.

12. The terminal device according to claim 11, wherein the processor is further configured to receive indication information, wherein the indication information is used to indicate a peer-end device targeted by the configuration information; and the network device is further configured to perform DRX configuration for the peer-end device.

13. The terminal device according to claim 11, wherein after the performing DRX configuration according to the configuration information, the processor is further configured to: transmit DRX feedback information to the network device, wherein the DRX feedback information indicates that the DRX configuration succeeds or indicates that the DRX configuration fails.

14. The non-transitory computer-readable storage medium according to claim 9, wherein after the performing DRX configuration according to the configuration information, the computer program is executed by the processor to perform the following steps:
transmitting DRX feedback information to the peer-end device, wherein the DRX feedback information indicates that the DRX configuration succeeds or indicates that the DRX configuration fails.

15. The non-transitory computer-readable storage medium according to claim 9, wherein before the determining DRX configuration information, the computer program is executed by the processor to perform the following steps:
transmitting DRX assistance information or a DRX configuration request to a network device.

16. The non-transitory computer-readable storage medium according to claim 9, wherein the determining DRX configuration information further comprises:
receiving DRX configuration information transmitted by a network device, wherein the configuration information is determined by the network device.

17. The non-transitory computer-readable storage medium according to claim 16, wherein the computer program is executed by the processor to perform the following steps:
receiving indication information, wherein the indication information is used to indicate a peer-end device targeted by the configuration information; and the network device is further configured to perform DRX configuration for the peer-end device.

18. The non-transitory computer-readable storage medium according to claim 16, wherein after the performing DRX configuration according to the configuration information, the computer program is executed by the processor to perform the following steps:

transmitting DRX feedback information to the network device, wherein the DRX feedback information indicates that the DRX configuration succeeds or indicates that the DRX configuration fails.

* * * * *